US008878504B2

(12) United States Patent
Komiya

(10) Patent No.: US 8,878,504 B2
(45) Date of Patent: Nov. 4, 2014

(54) SWITCHING REGULATOR

(75) Inventor: Yasuhide Komiya, Yokohama (JP)

(73) Assignee: Spansion LLC, Sunnyvale, CA (US)

( * ) Notice: Subject to any disclaimer, the term of this patent is extended or adjusted under 35 U.S.C. 154(b) by 253 days.

(21) Appl. No.: 13/187,013

(22) Filed: Jul. 20, 2011

(65) Prior Publication Data

US 2012/0091981 A1  Apr. 19, 2012

(30) Foreign Application Priority Data

Oct. 18, 2010  (JP) ................................ 2010-233213

(51) Int. Cl.
*H02M 3/157* (2006.01)
*H02M 3/156* (2006.01)
*H02M 1/00* (2006.01)

(52) U.S. Cl.
CPC ...... *H02M 3/156* (2013.01); *H02M 2001/0032* (2013.01); *Y02B 70/16* (2013.01)
USPC ............................ 323/283; 323/284; 323/285

(58) Field of Classification Search
USPC .................. 323/271, 282, 283, 284, 285, 299
See application file for complete search history.

(56) References Cited

U.S. PATENT DOCUMENTS

| | | | |
|---|---|---|---|
| 6,100,675 A | 8/2000 | Sudo | |
| 7,259,603 B2 * | 8/2007 | Gibson et al. | 327/170 |
| 7,701,181 B2 * | 4/2010 | Inoue | 323/268 |
| 7,800,351 B2 * | 9/2010 | Gan | 323/283 |
| 7,952,337 B2 * | 5/2011 | Gurcan | 323/282 |
| 8,022,680 B2 * | 9/2011 | Ryoo | 323/282 |
| 8,299,764 B2 * | 10/2012 | Laur et al. | 323/224 |
| 2008/0150500 A1 | 6/2008 | Gurcan | |
| 2009/0153124 A1 | 6/2009 | Ishii | |
| 2009/0174384 A1 | 7/2009 | Michishita et al. | |
| 2011/0115456 A1 * | 5/2011 | Tanifuji et al. | 323/283 |
| 2012/0056610 A1 * | 3/2012 | Kimura | 323/351 |

FOREIGN PATENT DOCUMENTS

| | | |
|---|---|---|
| CN | 101499713 A | 8/2009 |
| CN | 101542882 A | 9/2009 |
| EP | 2189870 A1 * | 5/2010 |

(Continued)

OTHER PUBLICATIONS

English language abstract for Chinese Patent Publication No. 101499713 A, May 2009.

(Continued)

*Primary Examiner* — Gary L Laxton
*Assistant Examiner* — Afework Demisse
(74) *Attorney, Agent, or Firm* — Sterne, Kessler, Goldstein & Fox P.L.L.C.

(57) ABSTRACT

A switching regulator has an output circuit having first and second transistors and a connection node thereof as an output terminal; a switching control unit generating a first and second switching pulses for alternately switching the first and second transistors according to the load; and a first comparator monitoring an output voltage, and generating a pulse stopping control signal for stopping the generation of the switching pulses when the output voltage rises, and for generating the switching pulses when the output voltage drops. And the switching control unit performs a stopping operation for stopping the switching pulse generation and a switching operation for generating the switching pulse in response to the pulse stopping control signal, and outputs, to the first comparator, a timing control signal for quickening a switching timing from the stopping operation to the switching operation as the load of the load circuit increases.

13 Claims, 17 Drawing Sheets

(56) References Cited

FOREIGN PATENT DOCUMENTS

| | | |
|---|---|---|
| JP | 11-155281 A | 6/1999 |
| JP | 2003-143836 A | 5/2003 |
| JP | 2008-125223 A | 5/2008 |
| JP | 2009-148111 A | 7/2009 |

OTHER PUBLICATIONS

English language abstract of Japanese patent publication No. 2008-125223 A, May 29, 2008.
English language abstract of Japanese patent publication No. 2003-143836 A, May 16, 2003.

* cited by examiner

US 8,878,504 B2

SWITCHING REGULATOR

CROSS-REFERENCE TO RELATED APPLICATIONS

This application is based upon and claims the benefit of priority of the prior Japanese Patent Application No. 2010-233213, filed on Oct. 18, 2010, the entire contents of which are incorporated herein by reference.

FIELD

The embodiment relates to a switching regulator.

BACKGROUND

A switching regulator generates internal power supply voltage which is used by a load circuit, from power supply voltage which is supplied. A switching regulator which generates DC internal power supply voltage from a DC power supply voltage is also called a "DC-DC convertor".

A switching regulator has a first transistor which is connected to a higher power supply voltage side, and a second transistor which is connected to a lower power supply voltage (ground) side, and supplies the output voltage to a load circuit via an LC smoothing circuit connected to the connection nodes of both transistors. By appropriately controlling the switching operation of both transistors, the output voltage is maintained at a desired potential. The LC smoothing circuit is disposed outside an integrated circuit chip where the switching regulator is formed, or is disposed on the integrated circuit chip.

The switching regulator monitors the output voltage, and alternately turns the first transistor and the second transistor ON so that the output voltage is maintained at a desired potential. For example, if the load is heavy and the output voltage drops, the "ON" period of the first transistor is increased, so as to suppress a drop in the output voltage. Alternatively, the switching regulator monitors the output current and controls the "ON" period of the first transistor according to the level of the output current, which changes according to the level of the output load.

The switching regulator is disclosed in the Japanese Patent Application Laid-Open No. 11-155281, and the Japanese Patent Application Laid-Open No. 2009-148111.

In order to improve the efficiency of a switching regulator, switching counts of both transistors are decreased in a light load state. For example, the switching frequency is lowered in a light load state to decrease the switching counts. Alternatively, the switching counts are decreased for a certain period by stopping the switching operation of both transistors in a light load state. Thereby when the load is light, a switching loss generated with the switching operation is decreased so as to improve efficiency.

However, if a number of time of switching is decreased or a switching operation is stopped, a period when electric current is not supplied to the output is generated, and a drop in the output voltage during this time increases fluctuation (ripple) of the output voltage, which is a problem. Particularly if the load gradually increases even with a light load state, the degree of a drop in the output voltage also increases, and the output voltage fluctuation (ripple) also increases.

SUMMARY

According to one aspect of the embodiment is a switching regulator having an output circuit which has a first transistor connected to a higher power supply side, a second transistor connected to a lower power supply side, and a connection node of the first transistor and the second transistor as an output terminal; a switching control unit which generates a first switching pulse and a second switching pulse for alternately switching the first transistor and the second transistor according to a load of a load circuit connected to the output terminal via a smoothing circuit; and a first comparator which monitors an output voltage generated through the smoothing circuit, and generates a pulse stopping control signal for stopping the generation of the first switching pulse and the second switching pulse when the output voltage rises, and for generating the first switching pulse and the second switching pulse when the output voltage drops. And the switching control unit performs a stopping operation for stopping the generation of the first switching pulse and the second switching pulse and a switching operation for generating the first switching pulse and the second switching pulse in response to the pulse stopping control signal, and outputs, to the first comparator, a timing control signal for quickening a switching timing from the stopping operation to the switching operation as the load of the load circuit increases.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A switching regulator according to the present embodiment has: an output circuit which has a first transistor connected to a higher power supply side, and a second transistor connected to a lower power supply side; and a switching control unit which generates a first switching pulse and a second switching pulse for alternately switching the first transistor and the second transistor according to a load of a load circuit which is connected to an output terminal, that is, a connection node of the first transistor and the second transistor, via a smoothing circuit. A concrete configuration of the switching regulator will be described later.

Figure 1:
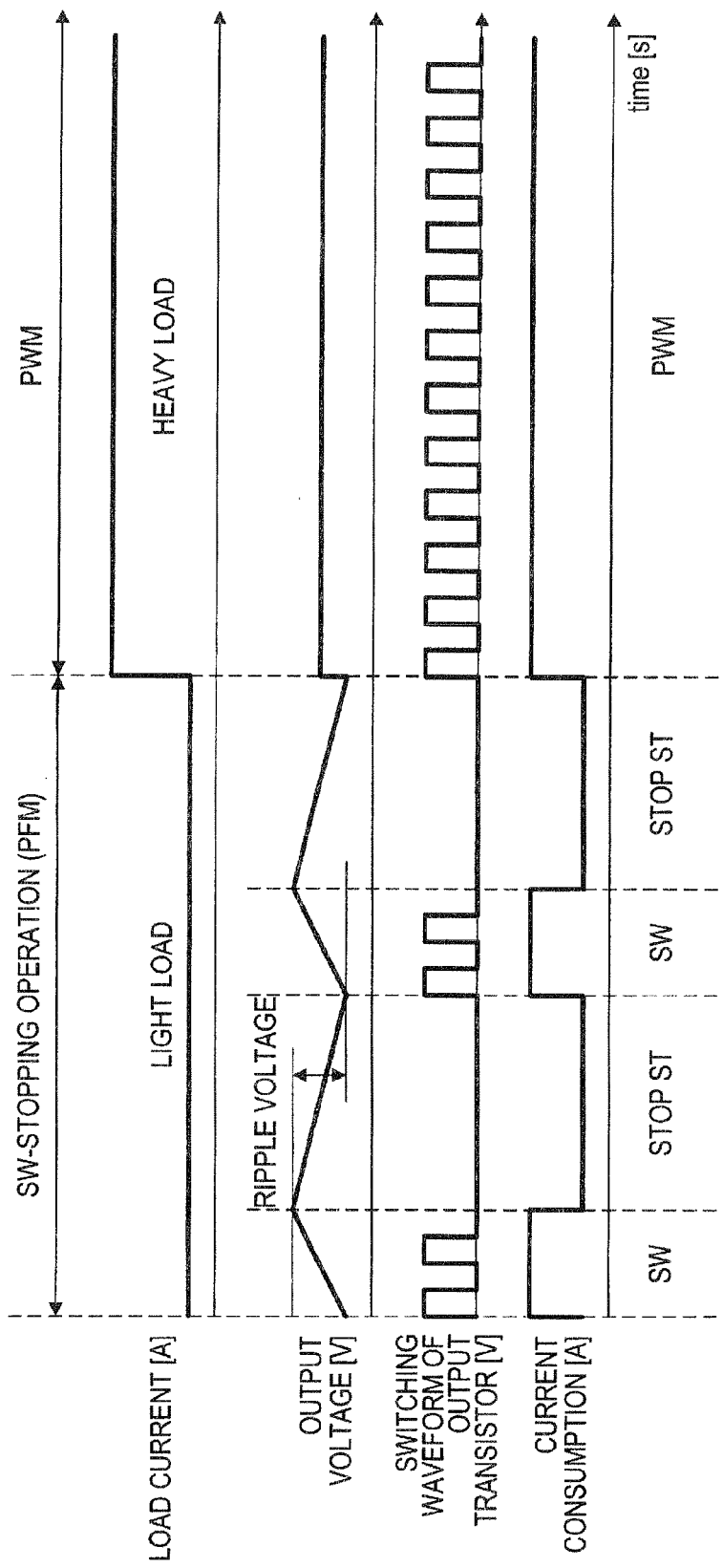
FIG. 1 illustrates operation of the switching regulator.

FIG. 1 illustrates operation of the switching regulator. In a heavy load state where a load current value Io is high, the switching control unit continuously generates the first switching pulse and the second switching pulse on which pulse width modulation (PWM) was performed according to the load of the load circuit. In FIG. 1, the pulse width of the switching waveform is constant, but actually the pulse width is controlled according to the load. For example, as the load becomes heavier, the "ON" time of the first transistor is increased, and as the load becomes lighter, the "ON" time is decreased. As a result, the output voltage is maintained to be approximately constant.

In the light load state, on the other hand, the switching control unit alternately repeats a switching operation period (SW in FIG. 1), where the first and second switching pulses are generated by pulse width modulation or the like, and a stopping period (ST in FIG. 1), where the generation of the first and second switching pulses is stopped. As a result, the output voltage has ripple voltage, which rises during the switching period SW, and falls during the stopping period ST.

Thus in the heavy load mode, the first and second transistors perform the switching operation by PWM, while in the light load mode, the switching period SW and the stopping period ST are alternately repeated. In other words, a kind of PFM is performed in the light load mode since the density of the switching pulses decreases.

Figure 2:
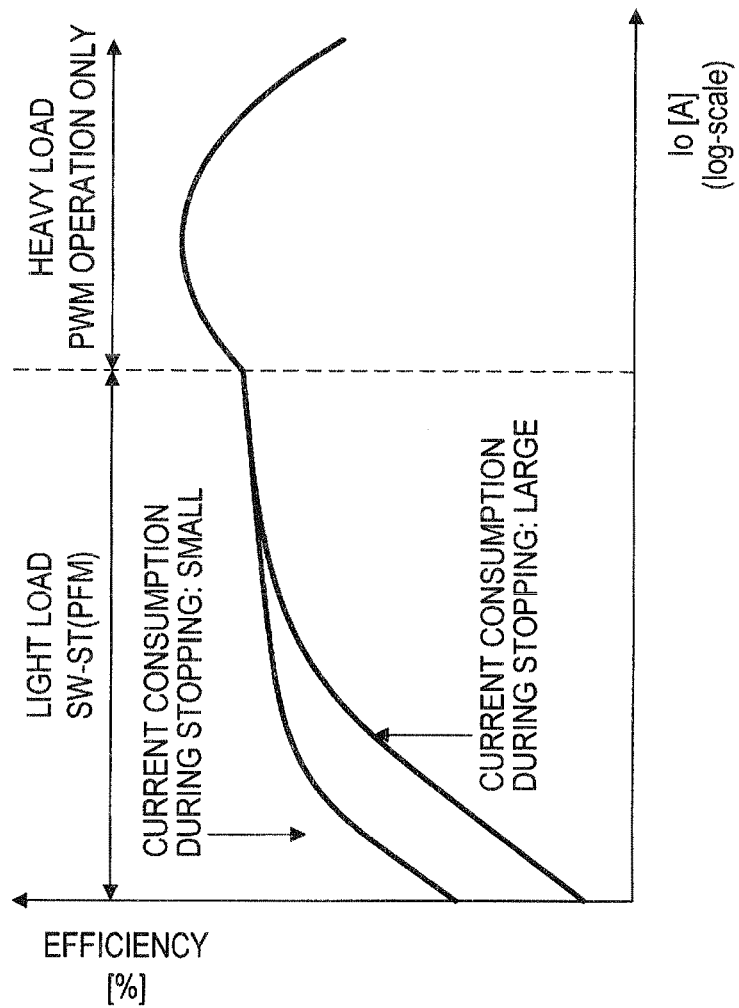
FIG. 2 is a graph depicting the relationship of load current Io of the switching regulator and efficiency.

FIG. 2 is a graph depicting the relationship of load current Io of the switching regulator and efficiency. The efficiency is a ratio of the power supplied to the load circuit, with respect to the input power. As FIG. 2 depicts, efficiency drops as the load becomes lighter, because the ratio of power consumption for the switching operation, with respect to the power supplied to the load circuit, is greater. In particular, decreasing the current consumption in the stopping period ST in the light load state is indispensable to increase the efficiency. Therefore in the case of a comparator which controls the switching period SW and the stopping period ST when the load is light, the bias current is set to the minimum in order to minimize the current consumption during the stopping period.

Figure 3:
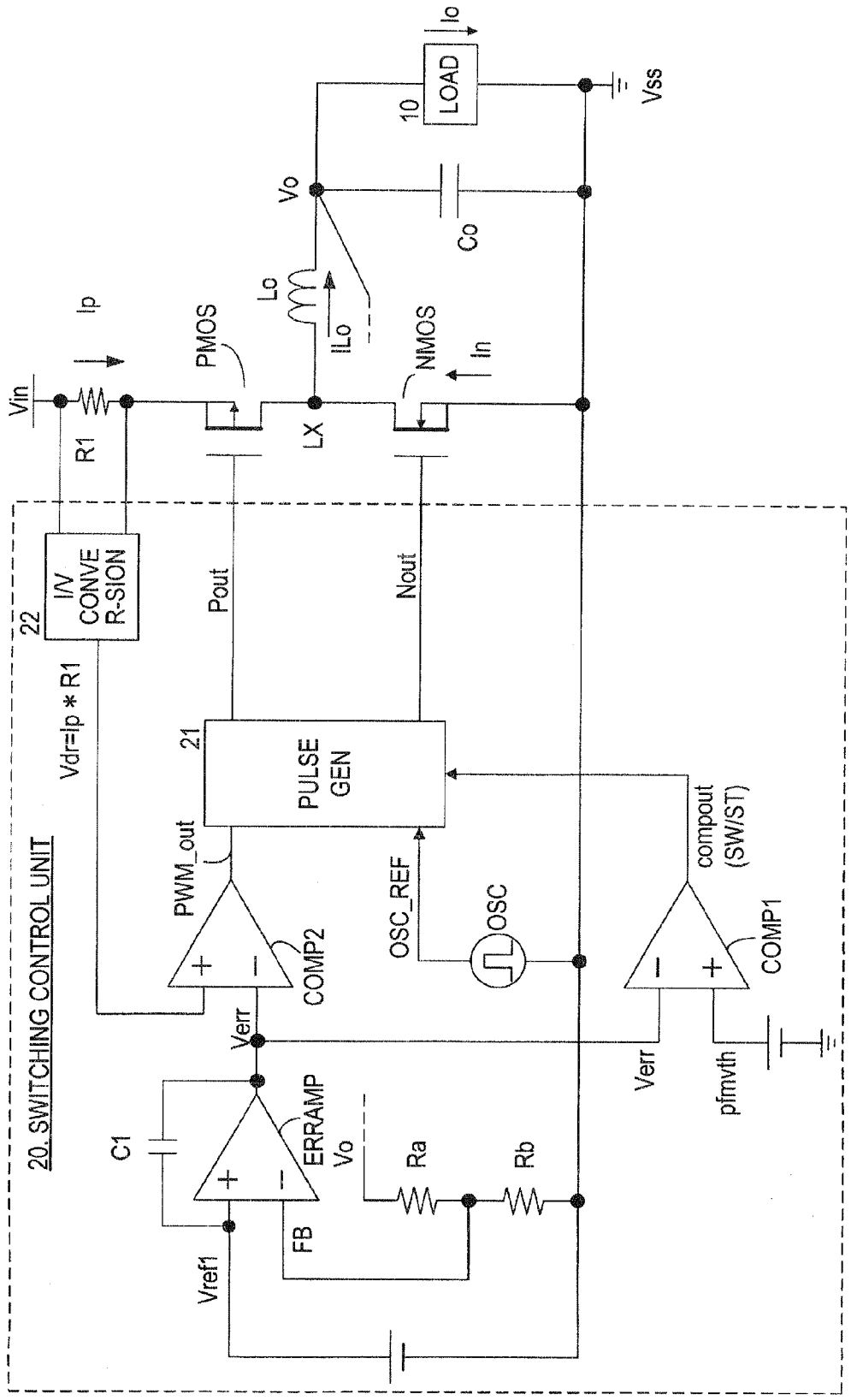
FIG. 3 is a block diagram of the electric current mode type switching regulator.

FIG. 3 is a block diagram of the electric current mode type switching regulator. The output voltage Vo to be supplied to a load circuit 10 is generated from the power supply voltage Vin. The switching regulator has an output circuit having a P-channel MOS transistor PMOS (first transistor) which is connected to the power supply voltage Vin side (higher power supply voltage), and an N-channel MOS transistor NMOS (second transistor) which is connected to a ground Vss side (lower power supply voltage). A smoothing circuit constituted by an inductor Lo and the capacitor Co is connected to a connection node LX of the two transistors. The output voltage Vo is generated via the smoothing circuit. The smoothing circuit constituted by the inductor Lo and the capacitor Co is, in many cases, disposed outside a semiconductor chip where the switching regulator is formed. But in some cases, the smoothing circuit may be disposed on the semiconductor chip.

The first and second transistors are alternately turned ON or OFF by the first and second switching pulses Pout and Nout. If the first transistor PMOS is turned ON and the second transistor NMOS is turned OFF, the connection node LX becomes the power supply potential, and the electric current Ip flows to the inductor Lo. After the first transistor PMOS is turned ON, the electric current ILo (=Ip) that flows into the inductor Lo gradually increases. Then if the first transistor PMOS is turned OFF and the second transistor NMOS is turned ON, the electric current In from the second transistor NMOS flows to the inductor Lo. The electric current ILo that flows to the inductor Lo gradually decreases from the increased electric current value. Then the electric current ILo eventually becomes zero, and in some cases, flows in a direction the opposite of the arrow mark in FIG. 3.

Among the electric current that flows in the inductor Lo, AC components are charged in the capacitor Co, where DC components flow to the load circuit 10 as load current To. As the load becomes heavier, the electric current Ip increases, and as the load becomes lighter, the electric current Ip decreases.

The switching control unit 20 of the switching regulator has an error amplifier ERRAMP which amplifies the difference of feedback voltage FB generated by dividing the output voltage Vo by resistors Ra and Rb and the first reference voltage Vref1, and an I/V conversion circuit 22, which converts the electric current IP, flowing through a resistor R1 between the first transistor PMOS and the power supply voltage Vin, into voltage Vdr, and a second comparator (PWM comparator) COMP2 which compares the converted voltage Vdr with differential voltage Verr which is output by the error amplifier ERRAMP, and outputs a pulse width modulation (PWM) signal PWM_out.

The error amplifier ERRAMP controls so that the feedback voltage FB becomes equal to the first reference voltage Vref1. The electric current Ip and the voltage Vdr converted therefrom, which depends on the weight of the load, are intermittently generated synchronizing with the switching operation of the first transistor PMOS. Therefore the PWM signal PWM_out is a pulse signal having a duty ratio in accordance with the weight of the load.

The error amplifier ERRAMP has a feedback capacitor C1, and if the load becomes heavy and the output voltage Vo decreases and the feedback voltage FB decreases, then the differential voltage Verr increases. If the load becomes light and the output voltage Vo increases, on the other hand, the differential voltage Verr decreases. In other words, the differential voltage Verr changes so as to have the opposite phase of the output voltage Vo.

As mentioned above, if the load becomes heavy, the electric current Ip increases, hence the voltage Vdr increases. As a result, the pulse width of the PWM signal PWM_out generated by the PWM comparator COMP2 becomes wider. If the load becomes light, on the other hand, the voltage Vdr decreases and the pulse width of the PWM signal PWM_out becomes narrower.

The switching control unit 20 also has a pulse generation circuit 21 for generating the first and second switching pulses Pout and Nout, and an oscillator OSC for generating a reference clock OSC_REF. Synchronizing with the reference clock OSC_REF, the pulse generation circuit 21 generates the first and second switching pulses Pout and Nout of which duty ratio is controlled based on the PWM signal PWM_out.

The switching control unit 20 has a first comparator (PFM comparator) COMP1 which compares the differential voltage Verr generated by the error amplifier (minus input), with a second reference voltage (PFM threshold voltage) pfmvth (plus input). The PFM comparator COMP1 determines the timings of the switching operation and the stopping operation in the PFM mode in the light load state. In other words, the PFM comparator COMP1 sets an output signal compout to H level if the output voltage Vo rises and the differential voltage Verr falls, and sets the output signal compout to L level if the output voltage Vo falls and the differential voltage Verr rises.

The pulse generation circuit 21 stops the generation of the first and second switching pulses Pout and Nout if compout is in H level, and generates the first and second switching pulses Pout and Nout if compout is in L level. In other words, the PFM comparator COMP1 is a comparator for generating the PFM control signal compout. The PFM control signal compout is a pulse stopping control signal, and the second reference voltage pfmvth is the PFM threshold voltage for differentiating the stopping operation and the switching operation in the PFM mode.

Therefore in a heavy load, the output voltage Vo is maintained at a desired voltage, the PFM control signal compout is maintained at L level, and the pulse generation circuit 21 continues to generate the first and second switching pulses Pout and Nout. In the case of the PFM operation in the light load state, on the other hand, the output voltage Vo ripples, and if the output voltage Vo rises, the PFM control signal compout becomes H level, the pulse generation circuit 21 enters the stopping operation where the switching pulse is not generated, and if the output voltage Vo falls, the PFM control signal compout has L level, and the pulse generation circuit 21 enters the switching operation where the switching pulse is generated.

Figure 4:
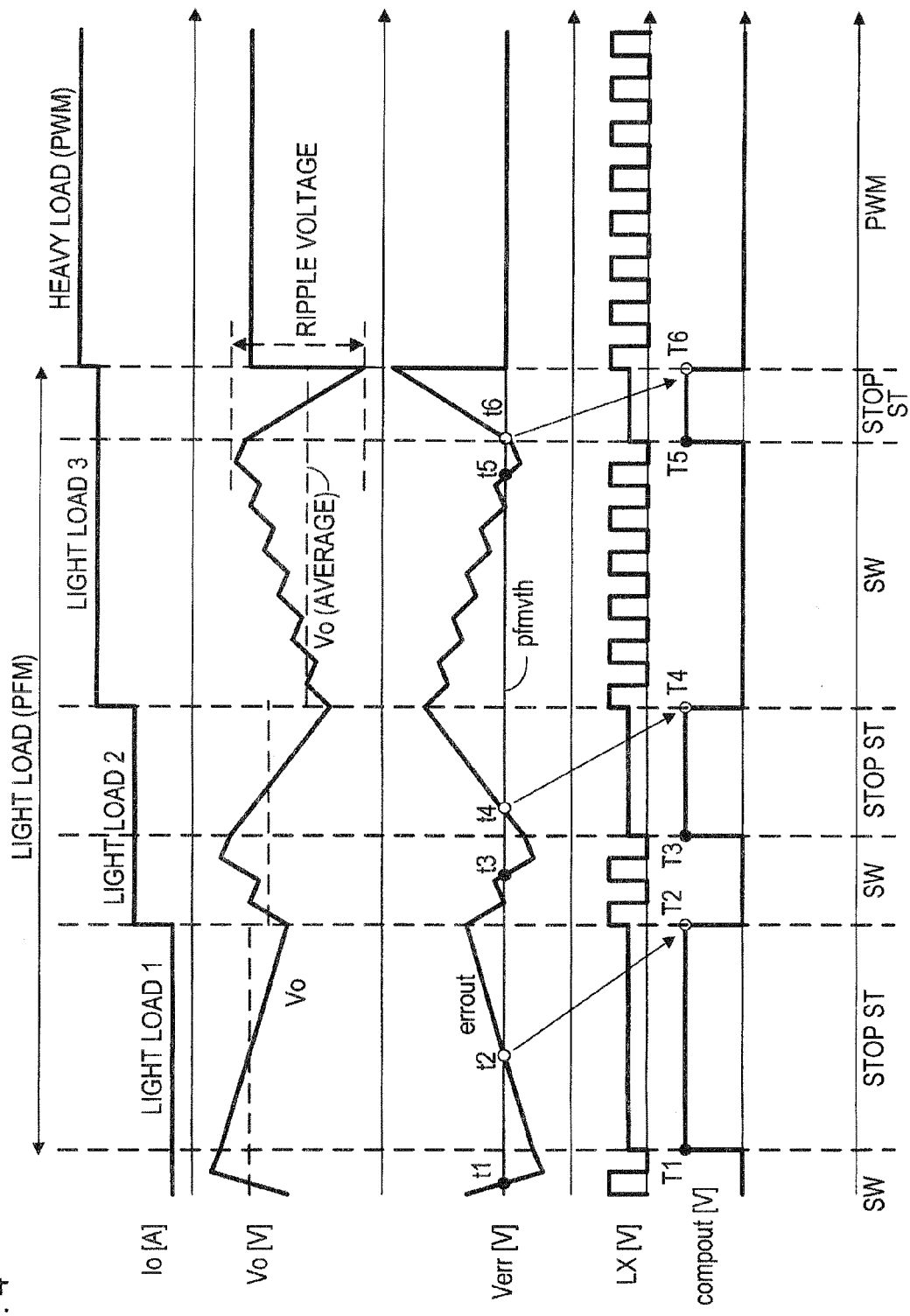
FIG. 4 illustrates the operation of the switching regulator in FIG. 3.

FIG. 4 illustrates the operation of the switching regulator in FIG. 3. In FIG. 4, three light load states, from light to heavy, and a heavy load state, are depicted. The output current Io increases as the load becomes heavier. As mentioned above, in the heavy load state, the pulse generation circuit 21 continuously generates the PWM-controlled first and second switching pulses Pout and Nout. In the light load state, the switching period SW, where the first and second switching pulses are generated, and the stopping period ST where the first and second switching pulses are not generated, are alternately repeated.

In response to the change of the output voltage Vo, the differential voltage Verr of the error amplifier ERRAMP changes to have the opposite phase of the output voltage Vo. If the differential voltage Verr becomes lower than the PFM threshold voltage pfmvth, the PFM control signal compout becomes H level, and the switching stopping period ST begins. This is as depicted with t1, t3 and t5 and T1, T3 and T5 in FIG. 4. If the differential voltage Verr becomes higher than pfmvth, on the other hand, the PFM control signal compout becomes L level, and the switching period SW begins. This is as depicted with t2, t4 and t6 and T2, T4 and T6 in FIG. 4.

However, because of the response speed of the first comparator COMP1, the time T1 to T6, when the PFM control signal compout changes, require a certain delay time with respect to the time t1 to t6 when the differential voltage Verr crosses the threshold pfmvth. As explained in FIG. 2, the bias current is designed to be minimum in order to make the efficiency higher in the light load, therefore, the response speed of the first comparator COMP1 is slow.

In the stopping period ST, the first and the second transistors do not perform switching operation, hence no electric current is supplied to the smoothing circuit. Therefore the output voltage Vo drops during the stopping period ST due to the load current of the load circuit. Furthermore, as depicted in FIG. 4, the voltage drop of the output voltage Vo is different depending on the level of the load, even within the light load state. The dropping level of the output voltage Vo is larger in the light load 3 state where load is heaviest than in the light load 1 state where load is the lightest.

As a result, in the PFM mode where the switching period SW and the stopping period ST are alternately repeated in the light load state, the fluctuating voltage and the ripple voltage of the output voltage Vo are higher as the load becomes heavier. Such an increase of the ripple voltage drops quality of the output voltage of the switching regulator, which is a DC-DC convertor, and is not desirable.

Figure 5:
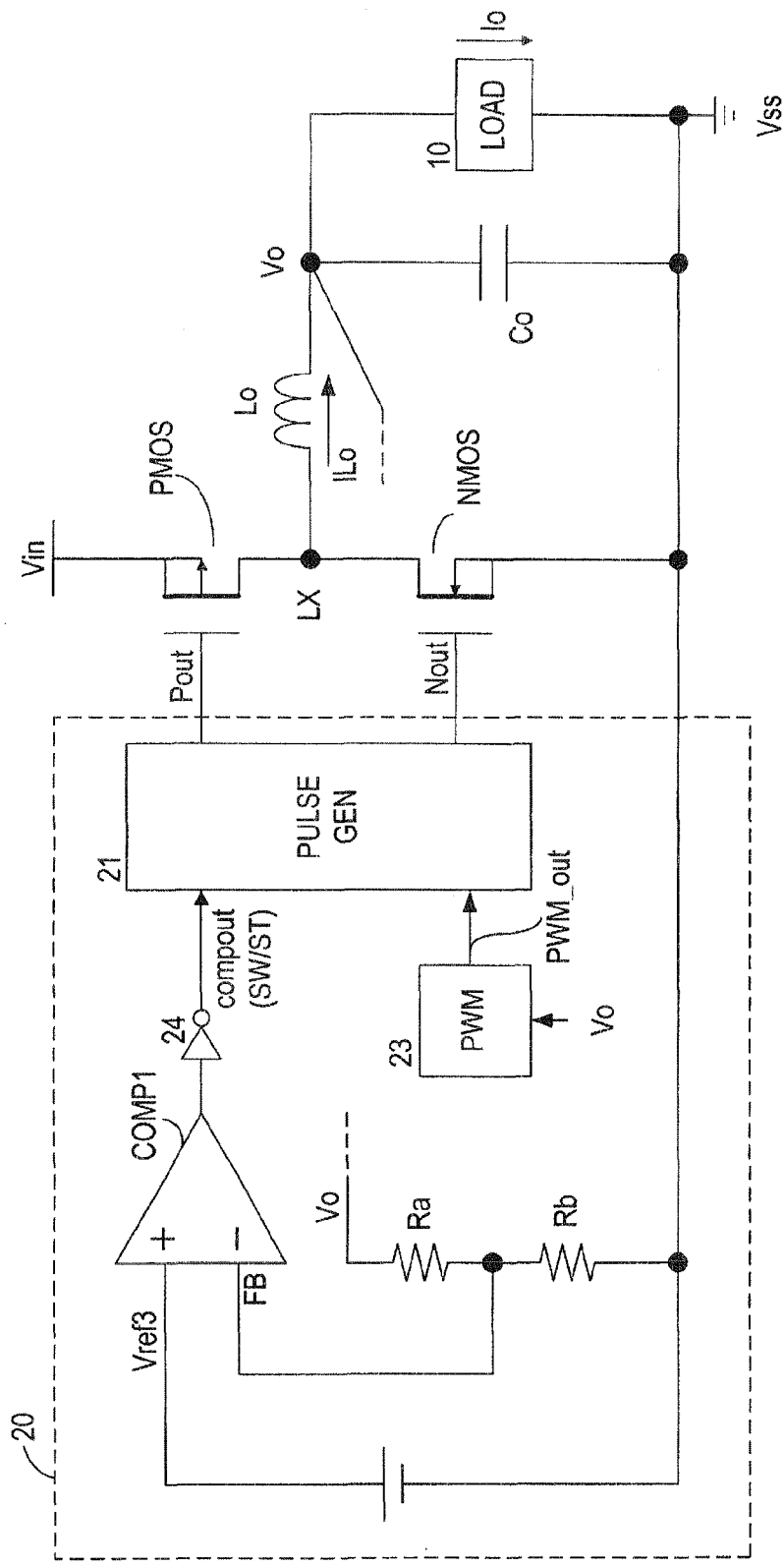
FIG. 5 is a block diagram of a comparator type switching regulator.

FIG. 5 is a block diagram of a comparator type switching regulator. In the case of the comparator type, a PFM comparator COMP1 for generating a PFM control signal compout compares the feedback voltage FB generated by dividing the output voltage Vo by resistors Ra and Rb (minus input) with reference voltage (PFM threshold voltage) Vref3 (plus input). The output of the PFM comparator COMP1 becomes the PFM control signal compout via an invertor 24.

A PWM circuit 23 monitors the output voltage Vo and generates a PWM pulse PWM_out, which is modulated to have a pulse width in according with Vo. Then based on the PWM pulse PWM_out, a pulse generation circuit 21 generates first and second switching pulses Pout and Nout synchronizing with the reference clock, which is not illustrated.

In the case of the PFM control in the light load state, the pulse generation circuit 21 repeats a switching period SW when the first and second switching pulses are generated, and a stopping period ST when the first and second switching pulses are not generated, according to the PFM control signal compout, and in the case of the PWM control in the heavy load state, the first and second switching pulses are generated.

Figure 6:
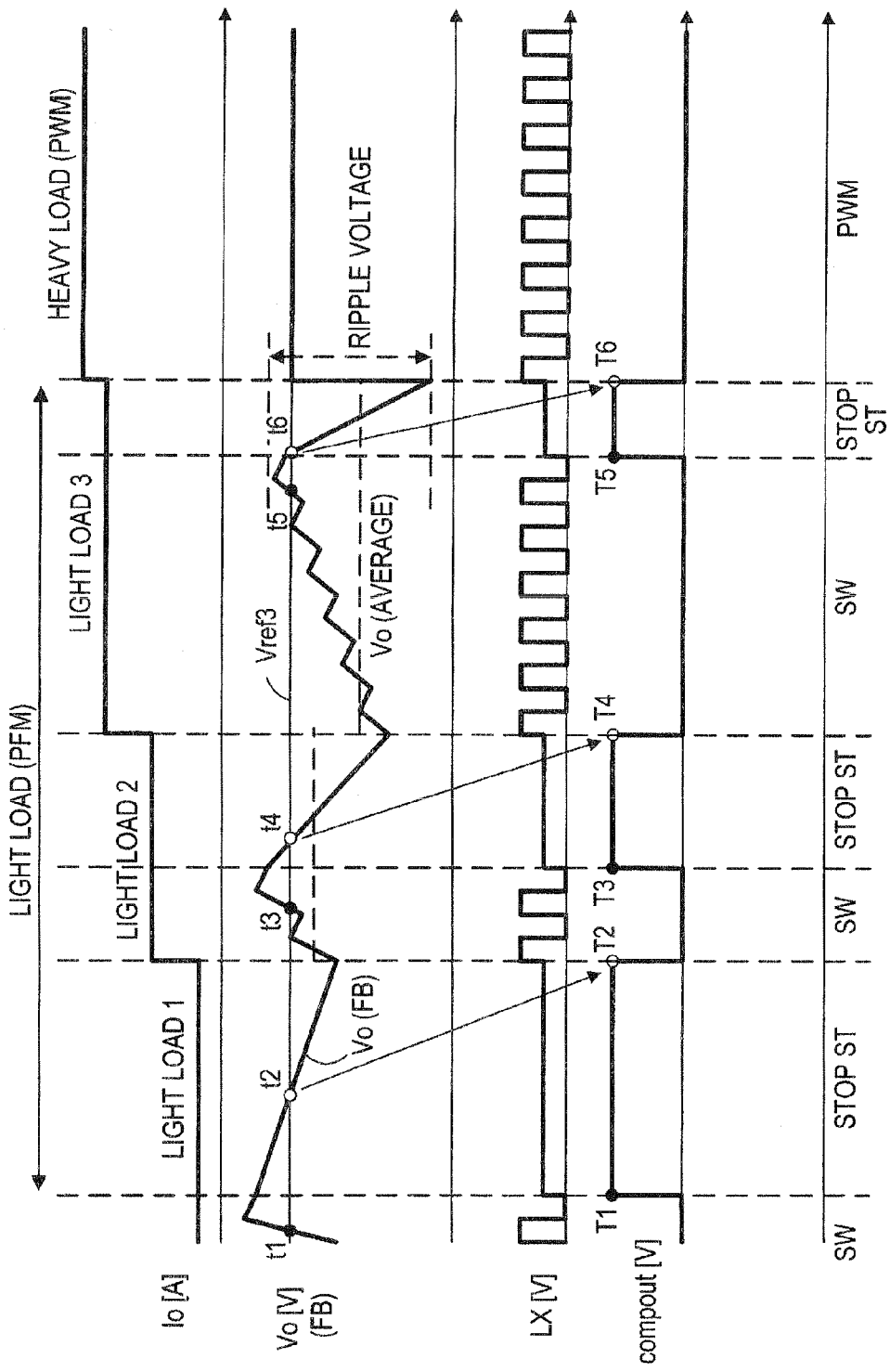
FIG. 6 illustrates an operation of the switching regulator in FIG. 5.

FIG. 6 illustrates an operation of the switching regulator in FIG. 5. In FIG. 6, just like FIG. 4, three light load states, from light to heavy, and a heavy load state are depicted. The output current To increases as the load becomes heavier. In the heavy load state, the pulse generation circuit 21 continuously generates the PWM-controlled first and second switching pulses Pout and Nout. In the PFM control in the light load state, on the other hand, the switching period SW, when the first and second switching pulses are generated, and the stopping period ST, where the first and second switching pulses are not generated, are alternately repeated.

The PFM comparator COMP1 compares the divided voltage FB of the output voltage Vo with the reference voltage Vref3, and sets the PFM control signal compout to H level if the output voltage Vo rises and exceeds the reference voltage Vref3. This is as depicted in time t1, t3 and t5 and T1, T3 and T5. If the output voltage Vo drops and becomes lower than the reference voltage Vref3, on the other hand, the comparator COMP1 sets the PFM control signal compout to L level. This is as depicted in time t2, t4, t6 and T2, T4 and T6. The stopping period ST begins at time T1, T3 and T5, and the switching period SW begins at time T2, T4 and T6.

However because of the response time of the PFM comparator COMP1, the time T1 to T6, when the PFM control signal compout changes, is after a certain delay time with respect to the time t1 to t6, when the output voltage Vo crosses the reference voltage Vref3. This is because the bias current of the PFM comparator is set to minimum.

In the case of the comparator type as well, in the stopping period ST, the first and second transistors do not perform switching operation, hence no electric current is supplied to the smoothing circuit Lo and Co, and the output voltage Vo drops during the stopping period ST due to the load current of the load circuit. Furthermore, the voltage drop of the output voltage Vo is different depending on the level of the load even within the light load state. The dropping level of the output voltage Vo is larger in the light load 3 state where load is heaviest than in the light load 1 state where load is lightest.

As a result, in the PFM mode where the switching period SW state and the stopping period ST are alternately repeated in the light load state, the fluctuating voltage, that is the ripple voltage, of the output voltage Vo, increases as the load is heavier.

First Embodiment

Figure 7:
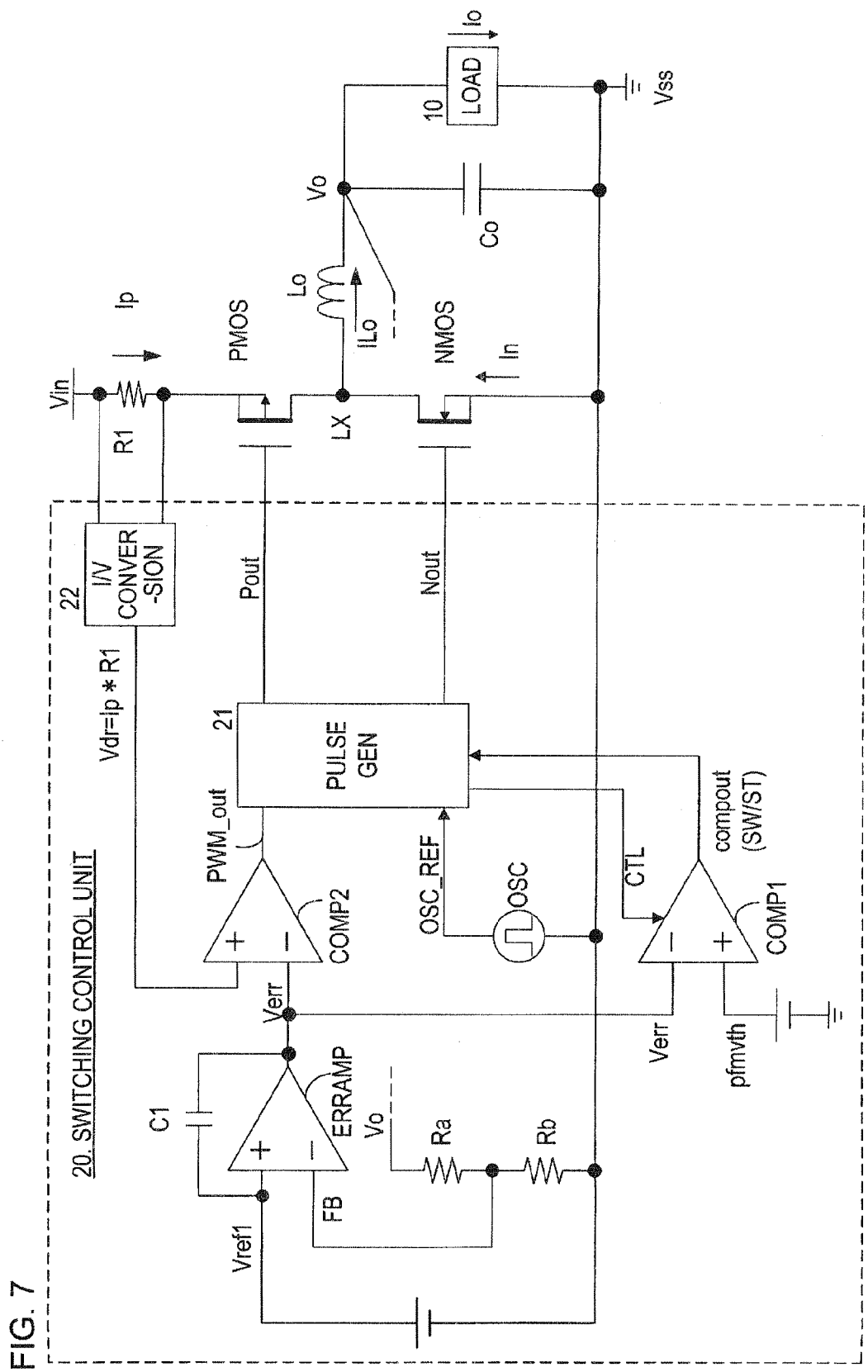
FIG. 7 is a block diagram of a switching regulator according to the first embodiment.

FIG. 7 is a block diagram of a switching regulator according to the first embodiment. This is an electric current mode type switching regulator, and composing elements the same as FIG. 3 are denoted with a same reference number.

In FIG. 7, a difference from FIG. 3 is that the pulse generation circuit 21 outputs a control signal CTL corresponding to a switching count in the switching period SW in the PFM mode in the light load state, and the response speed of the first comparator COMP1 is controlled according to this control signal CNT. As the switching count increases, the response speed is controlled to be faster, and the switching timing of the PFM control signal compout is controlled to be faster. In other words, the control signal CNT is a timing control signal for controlling the switching timing of the PFM comparator COMP1 to be faster. According to the example described below, the response speed is controlled by controlling the bias current value of the first comparator COMP1. In other words, the response speed increases by increasing the bias current.

Figure 8:
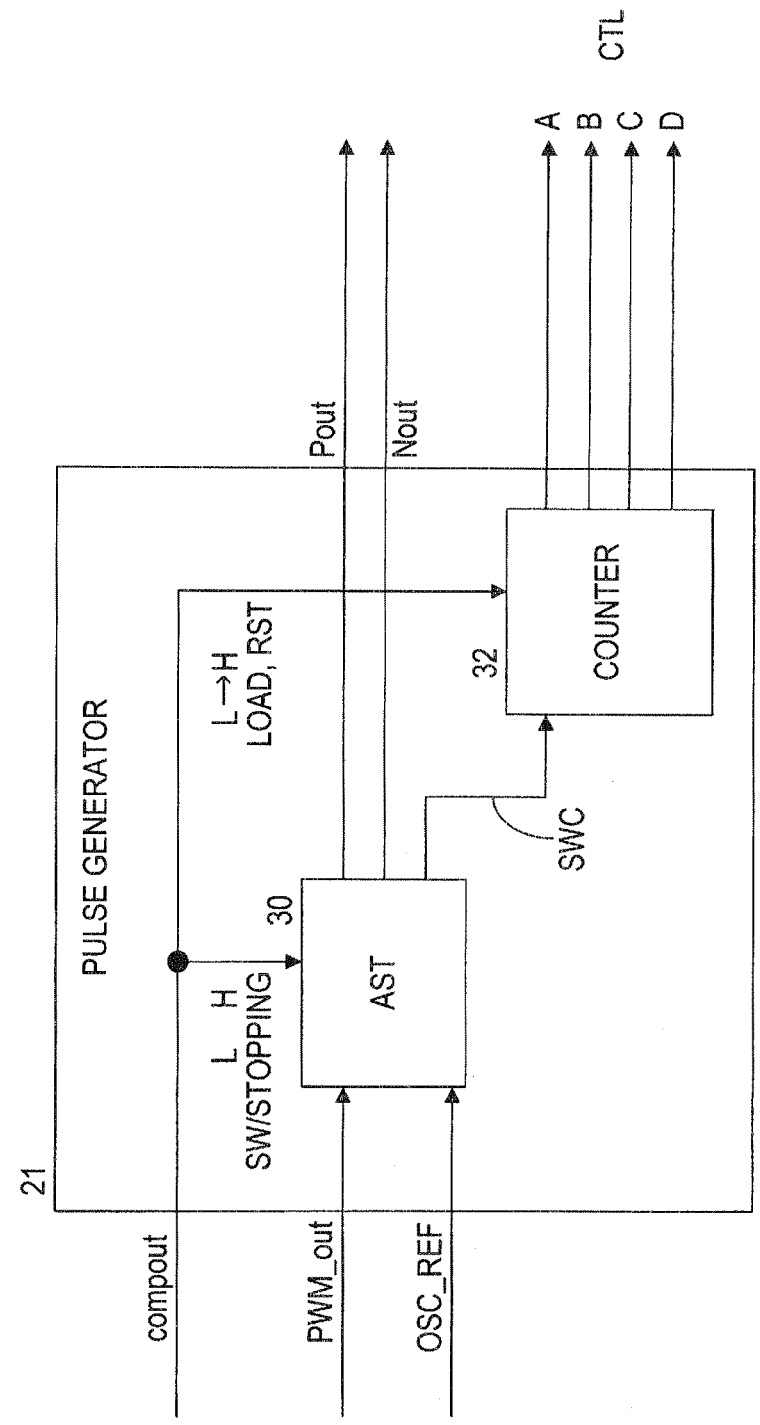
FIG. 8 is a block diagram of the pulse generation circuit 21.

FIG. 8 is a block diagram of the pulse generation circuit 21. In the pulse generation circuit 21, an anti-shoot circuit 30 synchronizes with the reference clock OSC_REF, and generates the first and second switching pulses Pout and Nout having a duty ratio corresponding to the PWM signal PWM_out. The anti-shoot circuit 30 generates the first and second switching pulses Pout and Nout, so that the first and second transistors do not turn ON simultaneously. The anti-shoot circuit 30 generates the first and second switching pulses Pout and Nout in the switching period SW (compout=L), and stops the generation in the stopping period ST (compout=H) according to the PFM control signal compout.

The pulse generation circuit 21 has a counter 32 which determines the switching count SWC in the switching period SW, and count signals A to D of the counter 32 are output as control signals CTL. In the count signals A to D, a number of count signals A to D which become "1" increases as the switching count increases. When the PFM control signal compout rises from the L level to the H level, the count value is loaded in the PFM comparator COMP1, and is reset immediately after that.

Figure 9:
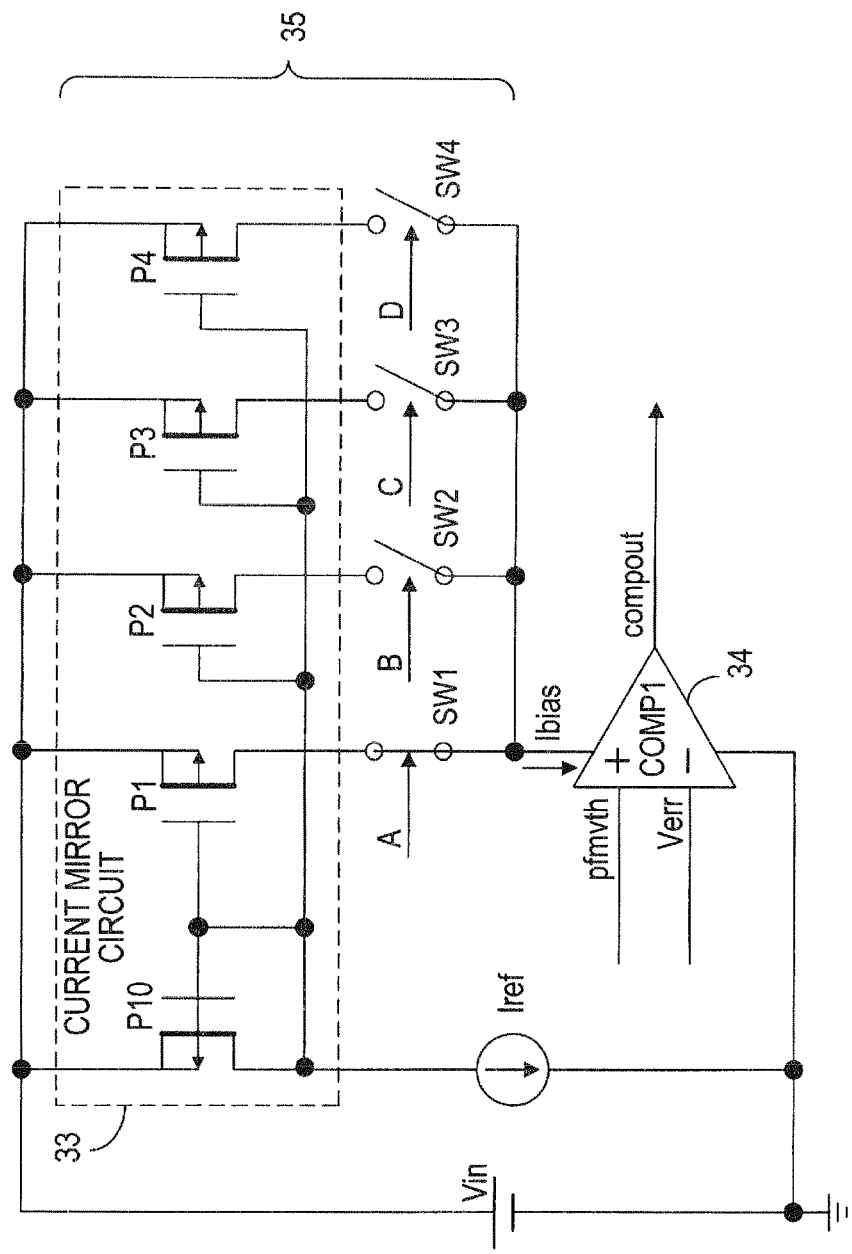
FIG. 9 is a circuit diagram of the PFM comparator COMP1.

FIG. 9 is a circuit diagram of the PFM comparator COMP1. In FIG. 9, a bias current circuit 35 and a differential transistor circuit 34 of the PFM comparator are depicted. The bias current circuit 35 is comprised of a current mirror circuit 33 and the switches SW1 to SW4, of which ON/OFF is controlled by the count signals A to D of the control signals CTL.

In the current mirror circuit 33, electric current, that is the transistor size ratio (to be more precise, the gate width ratio) times the reference current Iref, flows to the transistors P1, P2, P3 and P4. If the count signals A to D become "1" here, the switches SW1, SW2, SW3 and SW4 turn ON respectively, and the bias current Ibias, which flows to the differential transistor circuit 34, increases. If the bias current Ibias increases, the response characteristic of the differential transistor circuit 34 becomes faster, and time from the differential voltage Verr exceeding the threshold pfmvth to the inversion of the PFM control signal compout decreases (becomes shorter).

Figure 10:
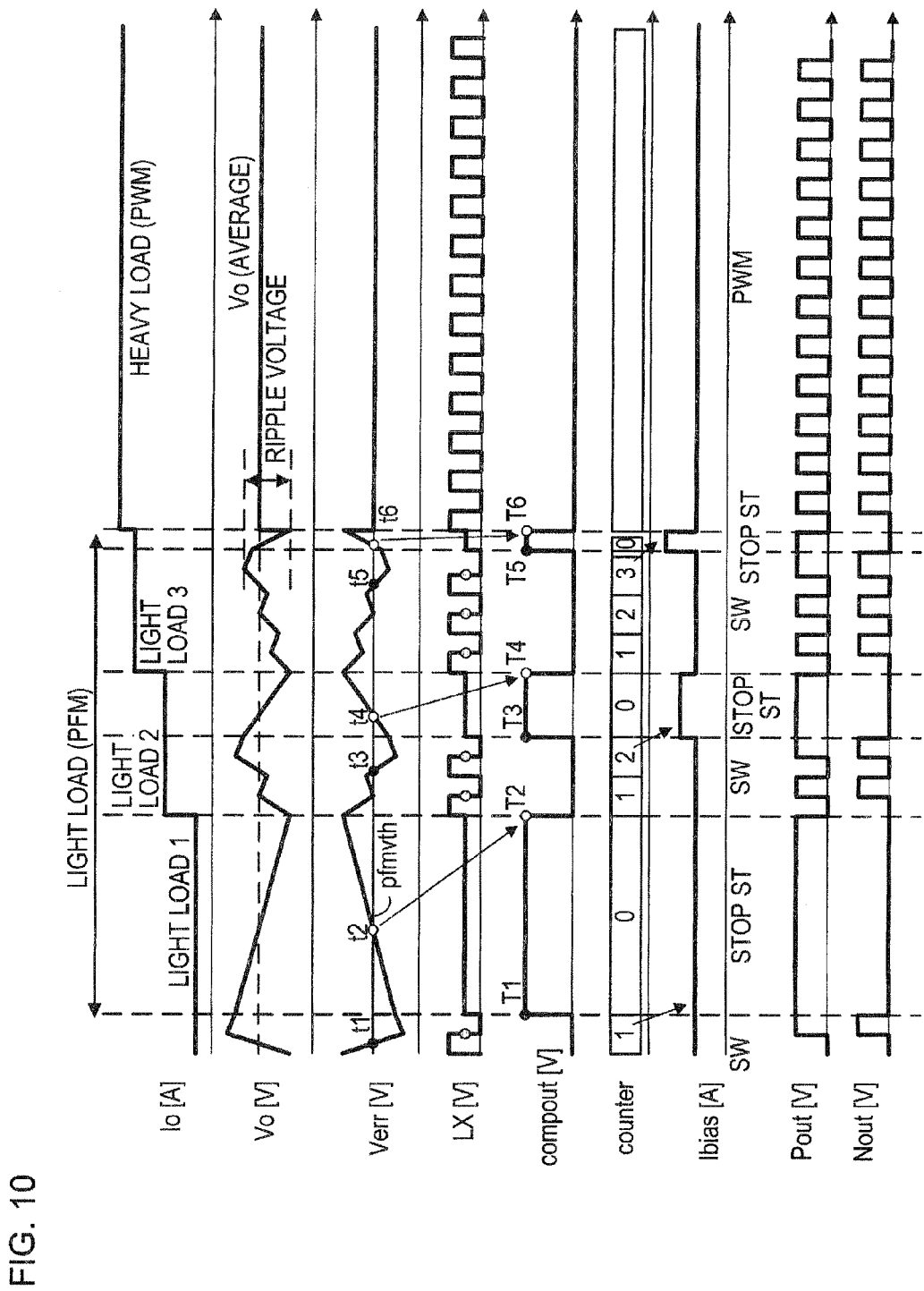
FIG. 10 illustrates the operation of the switching regulator of the first embodiment.

FIG. 10 illustrates the operation of the switching regulator of the first embodiment. In FIG. 10, a count value of the counter 32, bias current Ibias of the PFM comparator COMP1, and first and second switching pulses Pout and Nout are depicted in addition to the output current Io, output voltage Vo, differential voltage Verr, voltage of the connection node LX and PFM control signal compout depicted in FIG. 4.

In FIG. 10 as well, the PFM mode in the light load mode and the PWM mode in the heavy load mode are depicted, and in the light load mode, a light load 1 where load is lightest, a light load 2 where load is second lightest, and a light load 3 where load is heaviest sequentially transit. The output voltage Vo and the differential voltage Verr have opposite phases. In the PFM mode of the light load state, the PFM control signal compout becomes H level if the difference voltage Verr becomes lower than the threshold pfmvth, and the PFM comparator COMP1 sets the pulse generation circuit to the stopping operation ST state, and if the differential voltage Verr becomes higher than the threshold, on the other hand, the PFM control signal compout becomes L level, and the PFM comparator sets the pulse generation circuit to the switching operation SW state.

In the PWM mode of the heavy load mode, the duty ratio of the switching pulses Pout and Nout is variably controlled as the electric current Ip increases, so that the drive time by the transistor PMOS increases. In FIG. 10, however, the pulse width is constant to simplify the drawing.

As FIG. 10 depicts, corresponding to the change of the differential voltage Verr at time t1 to t6, the PFM comparator COMP1 inverts the PFM control signal compout to H level or L level after a certain time delay.

In FIG. 4, in order to suppress an increase in the width of a drop in the output voltage Vo, that is in order to suppress an increase in the ripple voltage, in the stopping operation period ST in the PFM mode in the light load state, the switching regulator performs the following operation.

First in the PFM mode in the light load state, the counter 32 determines the switching count in the switching operation period SW. In the switching operation period SW, the first and second switching pulses Pout and Nout are generated, and the output voltage Vo rises due to the drive operation of the first transistor PMOS when the first switching pulse Pout is at L level. If the output voltage Vo rises to a certain voltage, the differential voltage Verr becomes lower than the threshold pfmvth (time t1, t3, t5), and in response to this state, the PFM comparator COMP1 inverts the PFM control signal compout to H level (time T1, T3, T5). When the PFM control signal compout becomes H, the PFM comparator enters the stopping operation period ST.

In the stopping operation period ST, the first and second transistors do not operate, hence the output voltage Vo drops due to the load current. If the output voltage drops to a certain voltage, the differential voltage Verr becomes higher than the threshold pfmvth (t2, t4, t6), and in response to this state, the PFM comparator COMP1 inverts the PFM control signal compout to L level (time T2, T4, T6). The respective delay time from the time t2, t4 and t6 to the time T2, T4 and T6 corresponds to the response speed of the PFM comparator COMP2.

In the switching operation period SW, if the load is light, the count value of the counter is small since the output voltage Vo rises to a desired level with a small switching count, whereas the count value is large if the load is heavy. Therefore corresponding to the increase of the count value, the bias current Ibias of the PFM comparator is increased to make the response speed of the PFM comparator faster, so as to decrease (shorten) the respective delay time from time t2, t4 and t6 to the time T2, T4 and T6. Since the count value in the time T2 to T3 is "2", the bias current Ibias in the time T3 to T4 increases, and since the count value in the time T4 to T5 is "3", the bias current Ibias in the time T5 to T6 further increases.

As a result, the delay time from the time t4 to T4 and the delay time from time t6 to T6 are decreased in this sequence, and in the light load 2 and light load 3 where the load becomes heavier, the end timing of the stopping operation period ST is quickened, and the dropping level of the output voltage Vo in the stopping operation operation ST is decreased. Thereby the ripple voltage of the output voltage Vo can be suppressed.

In the PWM mode in the heavy load state, on the other hand, the PFM control signal compout does not change from L level to H level, hence the control signal CTL of the count value of the counter is not loaded and reflected in the bias circuit 35 of the PFM comparator.

In the present embodiment, it is preferable to set a minimum bias current of the PFM comparator that is required in the light load 1 state where the load is lightest. Then, by the counter and the bias current circuit of the PFM comparator COMP1, the level of the load is detected during the switching operation SW of the PFM control signal compout=L and the bias current Ibias is increased in the next stopping operation period ST at compout=H according to the detected level of the load. Thus the bias current of the PFM comparator is increased only when the load becomes heavier, and as a result, the efficiency is improved.

Second Embodiment

Figure 11:
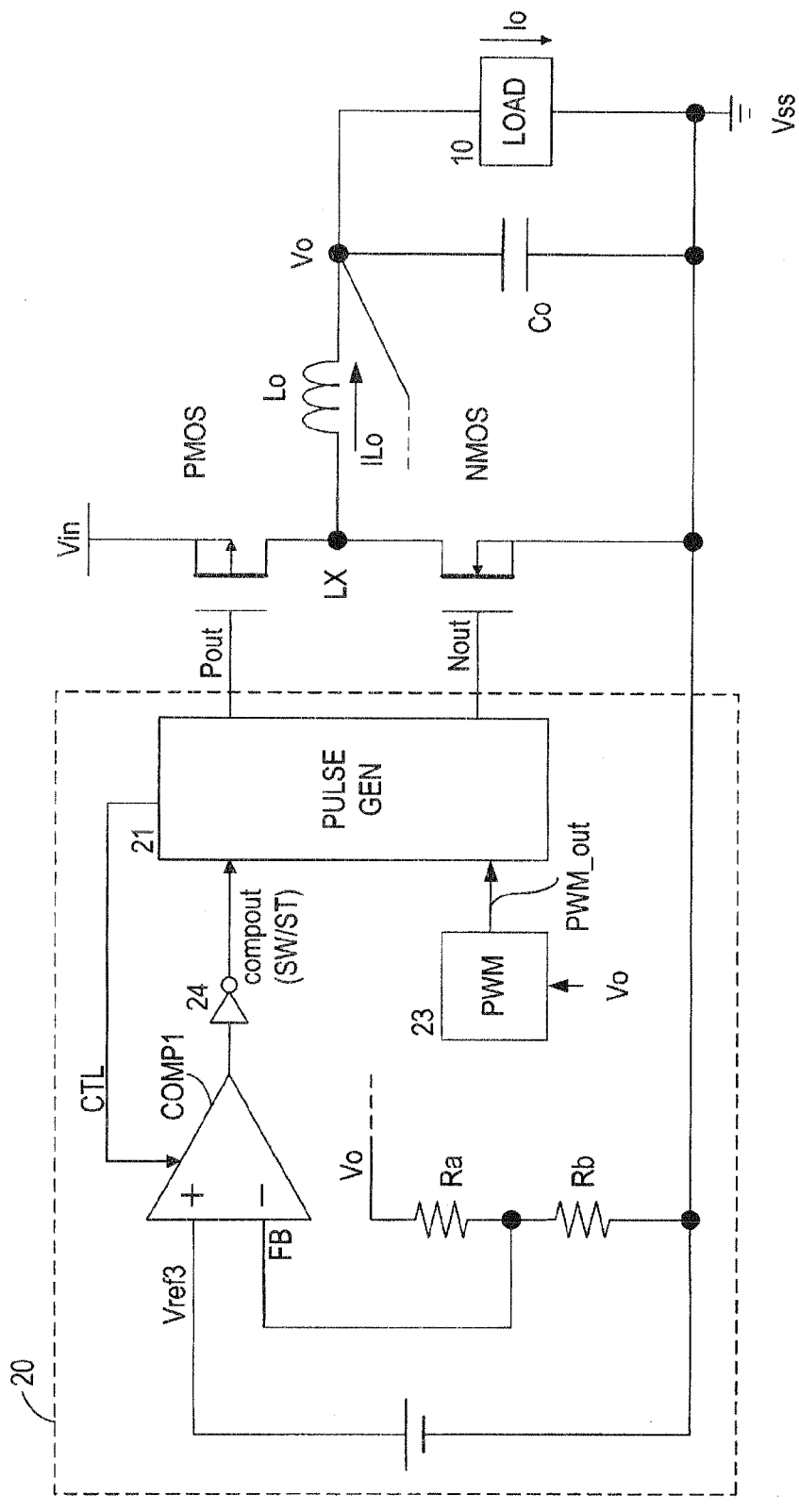
FIG. 11 is a block diagram of a switching regulator according to the second embodiment.

FIG. 11 is a block diagram of a switching regulator according to the second embodiment. This is a comparator type switching regulator, and is the same as FIG. 5. The difference from FIG. 5 is that in the PFM mode in the light load state, the pulse generation circuit 21 outputs a control signal CTL corresponding to the switching count in the switching period SW, and the response speed of the first comparator COMP1 is controlled according to this control signal CNT. This operation is approximately the same as the first embodiment.

Figure 12:
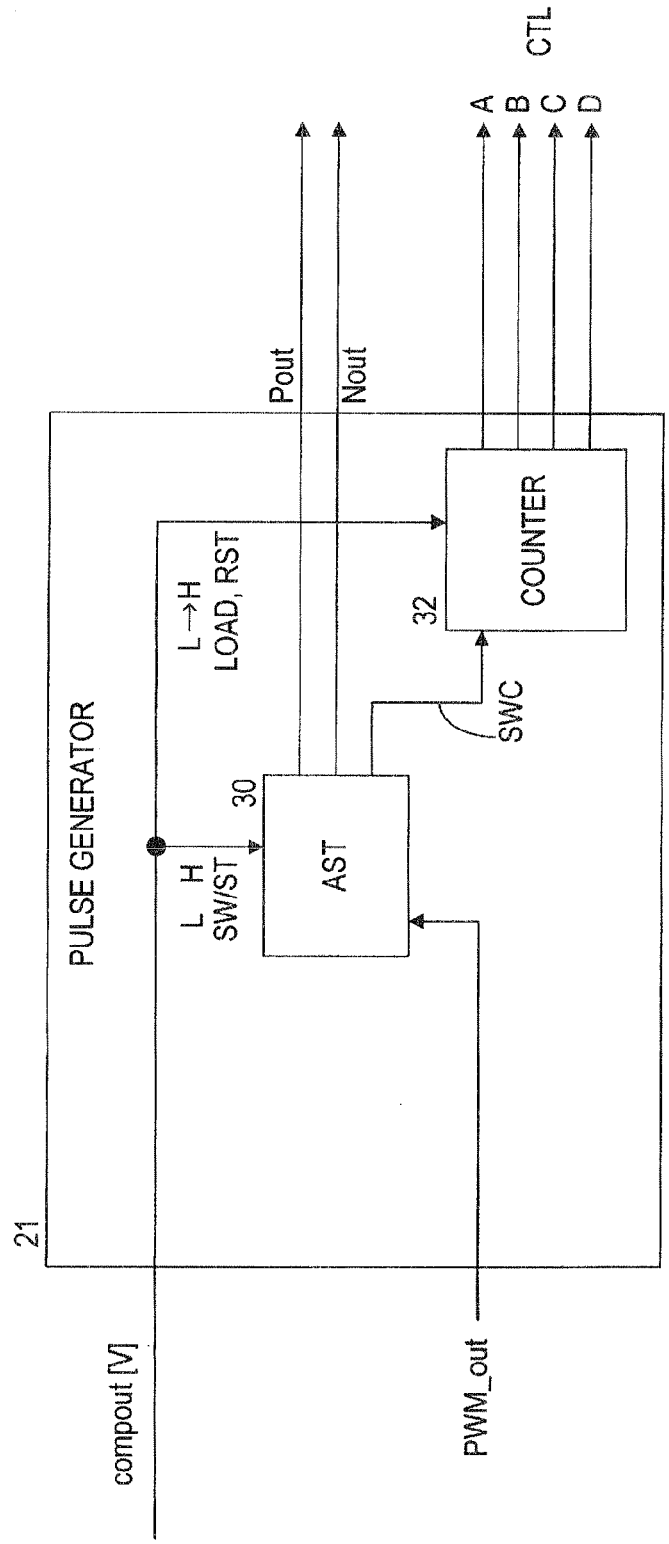
FIG. 12 is a block diagram of the pulse generation circuit.

FIG. 12 is a block diagram of the pulse generation circuit. The pulse generation circuit 21 has an anti-shoot circuit 30 which generates the first and second switching pulses Pout and Nout based on the PWM signal PWM_out, so as not to turn ON simultaneously, and a counter 32 which determines a switching count in the switching operation period SW in the PFM mode in the light load state. The operation of the counter 32 is the same as the first embodiment.

In the second embodiment as well, the bias current of the PFM comparator COMP1 is variably controlled according to the counter value. The configuration of the PFM comparator is the same as FIG. 9. Since the load is heavier as the switch count in the switching operation period SW is higher, the bias current of the PFM comparator is controlled to be increased as the switch count is higher. Then the response speed of the PFM comparator becomes faster as the load becomes heavier in the light load mode, and as a result, the dropping level of the output voltage Vo can be suppressed by decreasing the stopping period ST.

Figure 13:
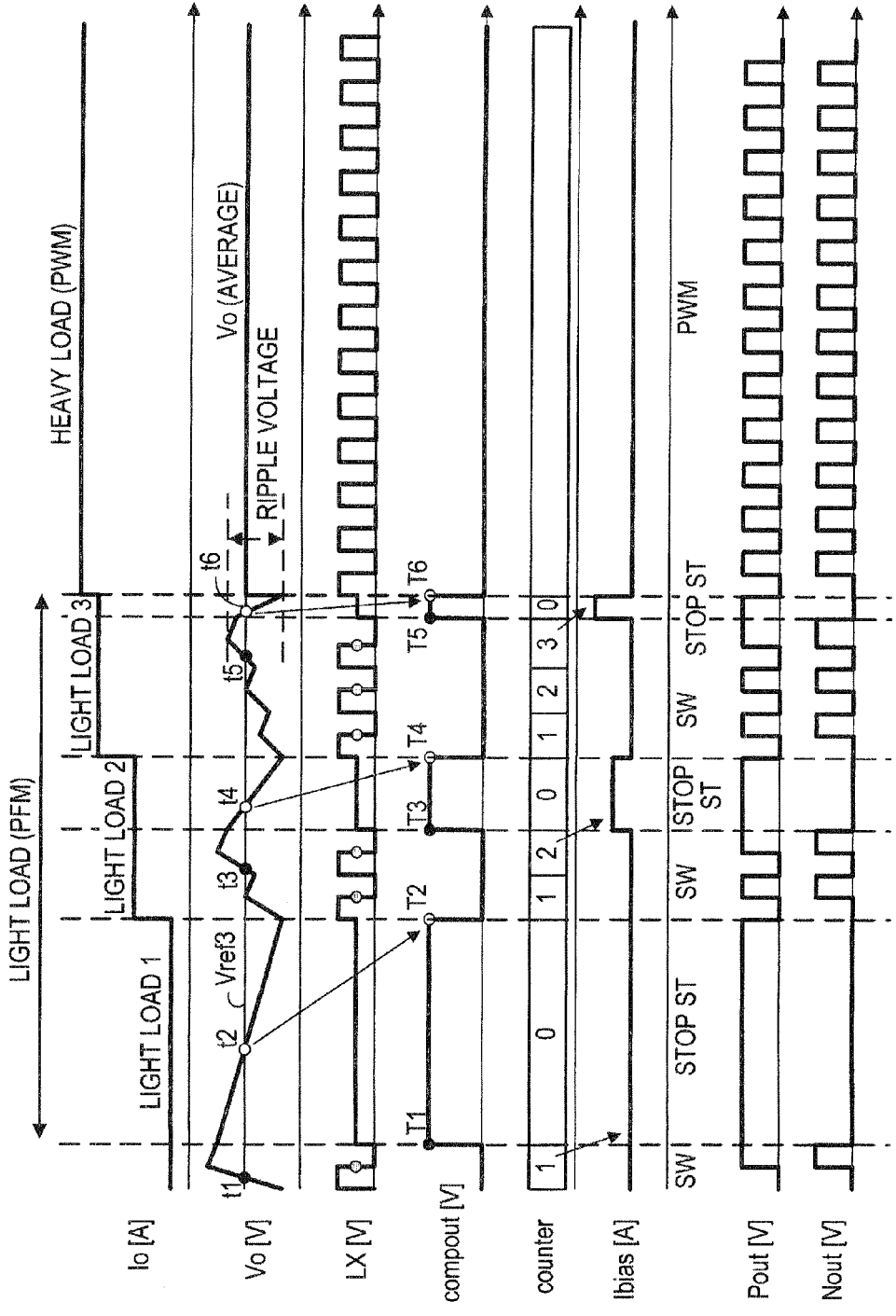
FIG. 13 illustrates the operation of the switching regulator of the second embodiment.

FIG. 13 illustrates the operation of the switching regulator of the second embodiment. A difference of FIG. 13 from FIG. 10, which illustrates the operation of the first embodiment, is that the PFM comparator COMP1 generates the PFM control signal compout based on the comparison of the output voltage Vo and the reference voltage Vref3. Control of the PFM control signal compout, the count value counter and the bias current Ibias of the PFM comparator in the other light load states is the same as FIG. 10.

In other words, just like FIG. 10, the counter 32 determines the switching count in the switching operation period SW, where the count value is small if the load is light, and the count value is large if the load is heavy. Therefore corresponding to the increase of the count value, the bias current Ibias of the PFM comparator is increased and the response speed of the PFM comparator is increased, so as to decrease the respective delay time from the time t2, t4 and t6 to the time T2, T4 and T6. Since the count value in the time T2 to T3 is "2", the bias current Ibias in the time T3 to T4 increases, and since the count value in the time T4 to t5 is "3", the bias current Ibias in the time T5 to T6 further increases.

As a result, the delay time from time t4 to T4, and the delay time from time t6 to T6 are decreased in this sequence, and in the light load 2 and light load 3 where the load becomes heavier, the end timing of the stopping operation period ST is quickened, and the dropping level of the output voltage Vo in the stopping operation period ST is decreased. Thereby the ripple voltage of the output voltage Vo in the case of a heavy load is suppressed. As FIG. 13 depicts, the ripple voltage of the output voltage Vo decreases, and as a result, the average voltage of the output voltage Vo in the light load state is approximately the same as the average value of the ideal output voltage Vo in the heavy load state.

Third Embodiment

In the first and second embodiments, in the PFM mode in the light load state, the load is measured, and as the load becomes heavier, the bias current of the PFM comparator is increased and the response speed thereof is increased, so that the switching timing from the stopping operation ST to the switching operation SW is quickened.

Whereas in the third embodiment, the offset voltage of the PFM comparator is increased as the load becomes heavier in the comparator type switching regulator, so that the PFM comparator COMP1 performs the comparison operation using a level higher than the reference voltage Vref3.

Figure 14:
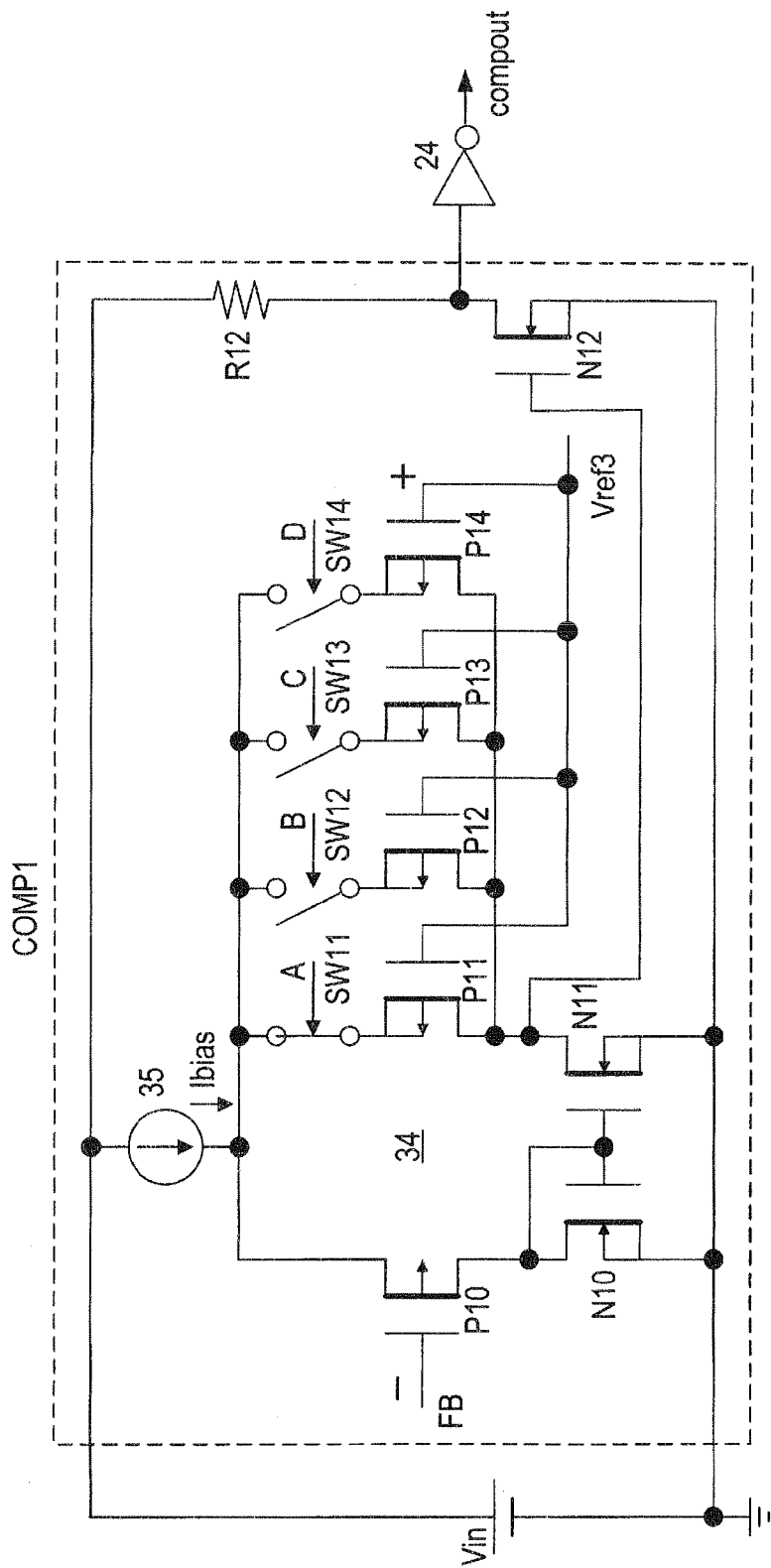
FIG. 14 is a circuit diagram of a PFM comparator COMP1 in the comparator type switching regulator according to the third embodiment.

FIG. 14 is a circuit diagram of a PFM comparator COMP1 in the comparator type switching regulator according to the third embodiment. In this PFM comparator COMP1, the bias current circuit 35 generates a constant bias current Ibias. Whereas the differential transistor circuit 34 has: a P-channel transistor P10 where minus input feedback voltage FB is applied to the gate, a P-channel transistor groups P11 to P14 where plus input reference voltage Vref3 is applied to the gate, N-channel load transistors N10 and N11, a resistor R12, and an N-channel transistor N12. The differential transistor circuit 34 also has switches SW11 to SW14 corresponding to the transistor groups P11 to P14 respectively.

It is designed such that when all the switches SW11 to SW14 are turned ON, the total transistor size (gate width) of the transistor groups P11 to P14 is the same as that of the transistor P10, and the offset voltage of the transistor P10 and the transistor groups P11 to P14 is 0. The switches SW11 to SW14 are controlled by the count signals A to D respectively, and the transistor size (gate width) on the plus input side P11 to P14 is variably controlled. When the control signals A to D are "1", the switches SW11 to SW14 turn OFF.

If the load of the load circuit becomes heavy, more count signals A to D become "1", so as to decrease a number of transistor groups P11 to P14 that constitute the differential transistor. As a result, the total transistor size (gate width) of the transistor groups P11 to P14 decreases. Due to this, the offset voltage of the differential transistor circuit 34 changes, and if the feedback voltage FB decreases, the transistor P10 is turned ON at a level higher than the reference voltage Vref3, the transistor N12 turns OFF, and the PFM control signal compout becomes L level.

By changing the offset voltage of the PFM comparator COMP1 using the count signals A to D like this, switching timing of the PFM comparator becomes quicker when the load is heavy compared with the case when the load is light.

Figure 15:
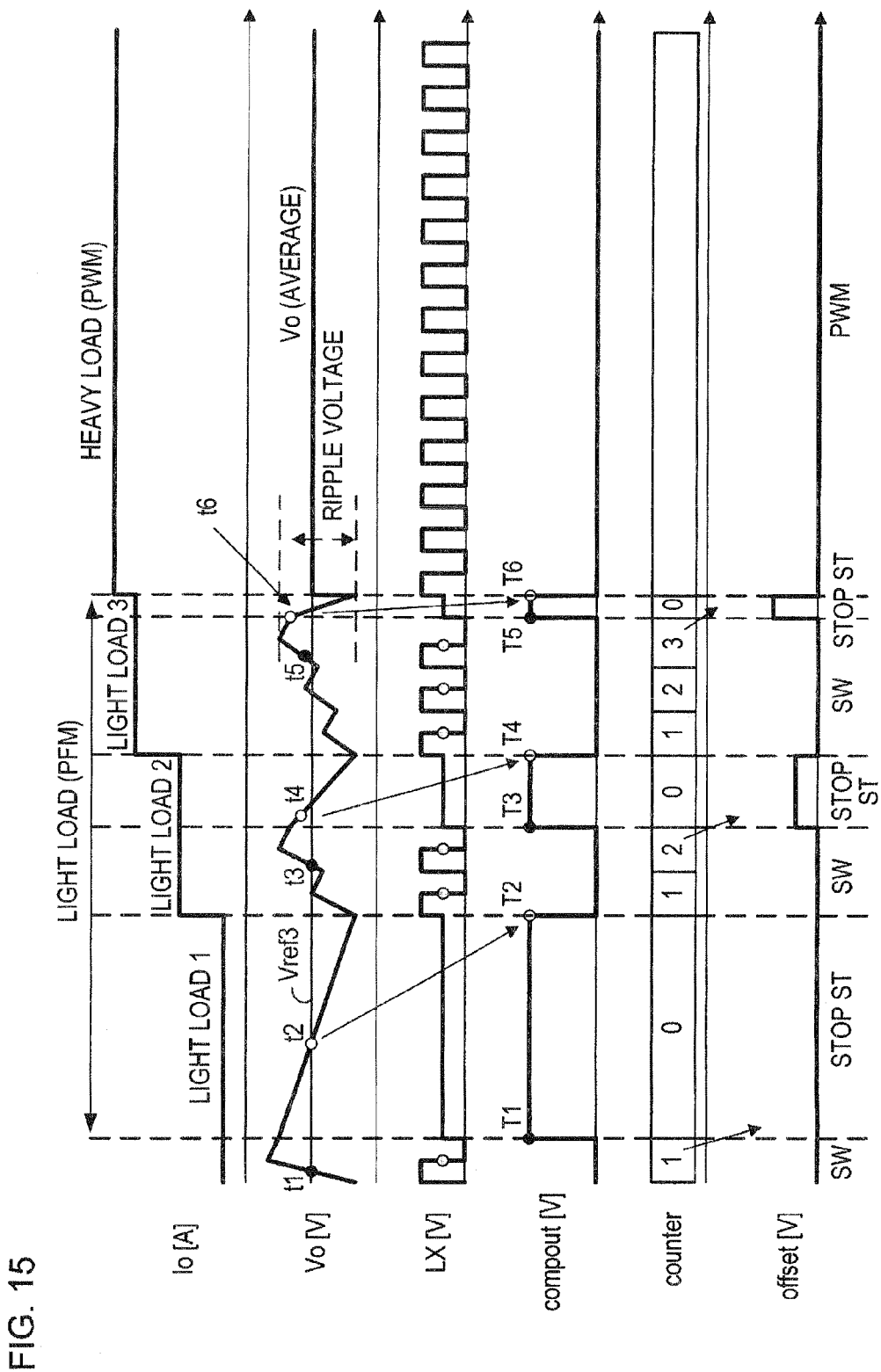
FIG. 15 illustrates operation of the comparator type switching regulator according to the third embodiment.

FIG. 15 illustrates operation of the comparator type switching regulator according to the third embodiment. As the comparison with FIG. 6 depicts, the offset voltage offset of the PFM comparator COMP1 is higher in the stopping periods ST (T3 to T4, T5 to T6) after the time T2 to T3 and time T4 to T5, where the counter values becomes "2" and "3". Therefore if the output voltage Vo drops to a level higher than the reference voltage Vref3 (time t4, t6), the PFM comparator COMP1 starts the switching operation SW, and the PFM control signal compout is switched from H level to L level after the response time elapses.

In other words, the switching timing from the stopping operation ST to the switching operation SW is quickened, and the dropping level of the output voltage Vo during the stopping period can be suppressed, by controlling the offset voltage. As a result, the ripple voltage of the output voltage Vo can be kept low. In FIG. 15, the average value of the output voltage Vo in the light load state matches with the average value in the heavy load state.

In the third embodiment, it is preferable that the bias current Ibias of the PFM comparator COMP1 is set to a minimum value according to the minimum operation speed of the PFM comparator, and the offset voltage is variably controlled without increasing the bias current Ibias. Then the current consumption of the PFM comparator in the light load mode can be further suppressed, and efficiency can be increased.

Fourth Embodiment

The switching regulator according to the fourth embodiment is an electric current mode type, and is a switching regulator to which the PFM comparator COMP1 of the third embodiment depicted in FIG. 14 is applied.

Figure 16:
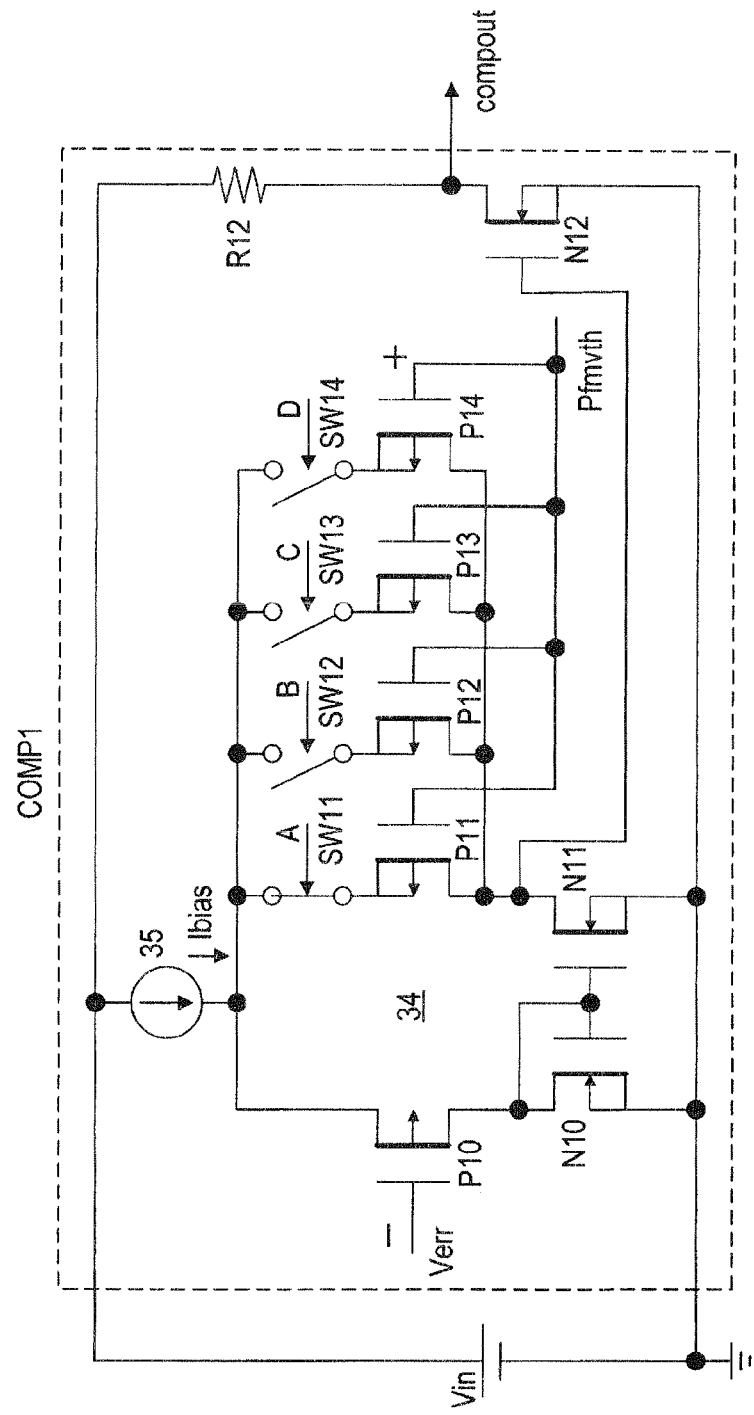
FIG. 16 is a circuit diagram of the electric current mode type PFM comparator COMP1 according to the fourth embodiment.

FIG. 16 is a circuit diagram of the electric current mode type PFM comparator COMP1 according to the fourth embodiment. Unlike FIG. 14, the output Verr of the error amplifier is input to the minus input side, and the PFM threshold voltage pfmvth is input to the plus input side respectively. It is designed such that when only one switch SW11 is turned ON, the transistor size (gate width) of the transistor P11 is the same as that of the transistor P10, and the offset voltage of the transistor P10 and the transistor groups P11 to P14 is 0.

The switches SW11 to SW14 are controlled by the count signals A to D respectively, and just like FIG. 14, the transistor size (gate width) on the plus input side is variably controlled, and the offset voltage of the comparator is variably controlled. When the control signals A to D are "1", in this case, the switches SW11 to SW14 turn ON.

If the load of the load circuit becomes heavy, more count signals A to D become "1", so as to increase a number of transistor groups P11 to P14 that constitute the differential transistor. As a result, the total transistor size (gate width) of the transistor groups P11 to P14 increases. Due to this, the offset voltage of the differential transistor circuit 34 changes, and if the differential voltage Verr increases, the transistor P10 side turns OFF at a level lower than the threshold voltage pfmvth, the transistor N12 turns ON, and the PFM control signal compout becomes L level.

By changing the offset voltage of the PFM comparator COMP1 using the count signals A to D like this, the switching timing of the PFM comparator becomes quicker when the load is heavy compared with the case when the load is light.

In this way, in the electric current mode type, the PFM comparator COMP1 compares the output Verr of the error amplifier, having the opposite phase of the output voltage Vo, with the threshold voltage pfmvth. In the light load mode, more count signals A to D become "1" as the load becomes heavier, and a number of transistor groups P11 to P14 which are connected increases, and the total transistor size (gate width) increases accordingly. As a result, the offset voltage changes, and when the differential voltage Verr rises, the transistor P10 side switches to the "OFF" state at a level lower than the threshold voltage pfmvth, and the PFM control signal compout becomes L level.

By changing the offset voltage of the PFM comparator COMP1 using the count signals A to D like this, the switching timing of the PFM comparator becomes quicker, and the dropping level of the output voltage Vo can be decreased.

Figure 17:
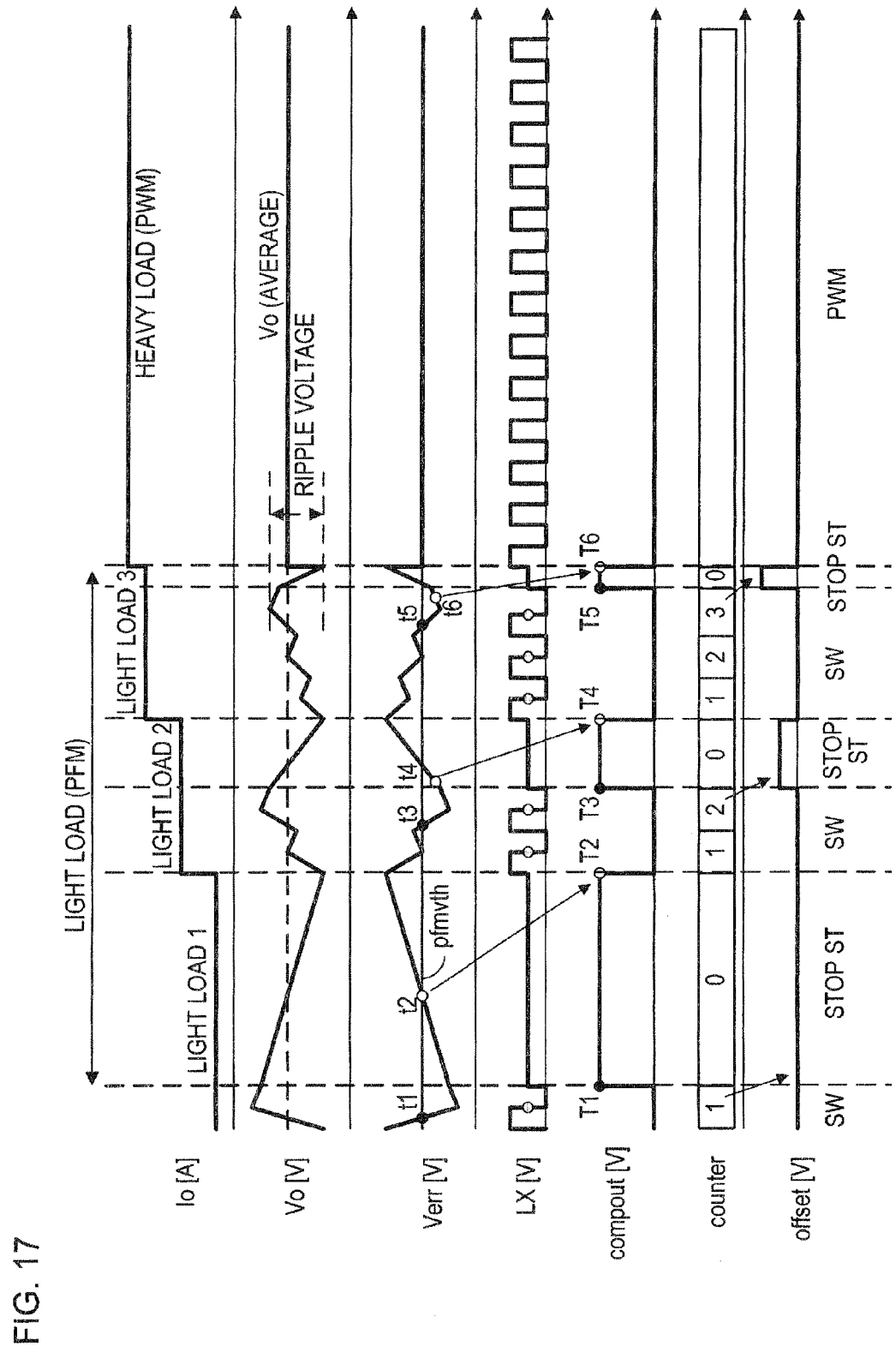
FIG. 17 illustrates the operation of the switching regulator according to the fourth embodiment.

FIG. 17 illustrates the operation of the switching regulator according to the fourth embodiment. In the light load 2 and light load 3 where the load becomes heavier, the PFM comparator COMP1 generates the switching operation at a level lower than the threshold voltage pfmvth when the differential voltage Verr rises (time t4, t6). As a result, the switching time T4 and T6 from the stopping operation ST to the switching operation PWM is quickened. In this case as well, the average value of the output voltage Vo in the light load state matches with the average value thereof in the heavy load state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switching regulator, comprising:
    an output circuit having a first transistor connected to a higher power supply side, a second transistor connected to a lower power supply side, and a connection node of the first transistor and the second transistor as an output terminal;
    a switching control unit configured to generate a first switching pulse and a second switching pulse to alternately switch the first transistor and the second transistor according to a load of a load circuit connected to the output terminal via a smoothing circuit; and
    a first comparator configured to monitor an output voltage generated through the smoothing circuit, and generate a pulse stopping control signal to stop the generation of the first switching pulse and the second switching pulse when the output voltage rises, and to generate the first switching pulse and the second switching pulse when the output voltage drops, wherein
    the switching control unit further configured to perform a stopping operation to stop the generation of the first switching pulse and the second switching pulse and a switching operation to generate the first switching pulse and the second switching pulse in response to the pulse stopping control signal, and the switching control unit further configured to output a timing control signal to the first comparator, wherein the first comparator is further configured to change the pulse stopping control signal, in response to the timing control signal, to switch from the stopping operation to the switching operation as the load of the load circuit increases.

2. The switching regulator according to claim 1, wherein the first comparator increases a response speed according to the timing control signal.

3. The switching regulator according to claim 2, wherein the first comparator includes a bias current source and a differential transistor pair to which an electric current of the bias current source is supplied, the differential transistor pair configured to compare the output voltage or a differential voltage between the output voltage and a first reference voltage with a second reference voltage, and outputting the pulse stopping control signal, and wherein an electric current value of the bias current source increases according to the timing control signal, so as to change the pulse stopping control signal from a stopping state to a switching state.

4. The switching regulator according to claim 2, wherein the first comparator includes a bias current source and a differential transistor pair to which an electric current of the bias current source is supplied, the differential transistor pair configured to compare the output voltage or a differential voltage between the output voltage and a first reference voltage with a second reference voltage, and outputting the pulse stopping control signal, and wherein an offset of the differential transistor pair increases according to the timing control signal, so as to change the pulse stopping control signal from a stopping state to a switching state.

5. The switching regulator according to claim 4, wherein in the first comparator, a gate width of one transistor of the differential transistor pair changes according to the timing control signal, so as to increase an offset of the differential transistor pair.

6. The switching regulator according to claim 1, wherein the switching control unit is configured to determine switching counts of the first switching pulse and the second switching pulse in a switching period between the stopping periods, and generate the timing control signal based on the count values.

7. The switching regulator according to claim 1, wherein the switching control unit has a heavy load mode where the generation of the first switching pulse and the second switching pulse is continued according to the load of the load circuit, and a light load mode where the switching operation to generate the first switching pulse and the second switching pulse and the stopping operation to stop the generation of the first switching pulse and the second switching pulse, are repeated.

8. The switching regulator according to claim 7, further comprising:

an error amplifier configured to generate a differential output of the output voltage and a first reference voltage; and a second comparator configured to compare the differential output of the error amplifier with a drive current value flowing through the first transistor, and generates a pulse width control signal to control pulse widths of the first switching pulse and the second switching pulse, wherein the first comparator further configured to compare the differential output of the error amplifier with the second reference voltage, and configured to generate the pulse stopping control signal that indicates the switching operation and the stopping operation in the light load mode.

9. The switching regulator according to claim 7, wherein the first comparator further configured to compare the output voltage with a second reference voltage, and generates the pulse stopping control signal that indicates the switching operation and the stopping operation in the light load mode.

10. A switching regulator, comprising:

an output circuit that has a first transistor connected to a higher power supply side, a second transistor connected to a lower power supply side, and a connection node of the first transistor and the second transistor as an output terminal;

a switching control unit configured to generate a first switching pulse and a second switching pulse to alternately switch the first transistor and the second transistor according to a load of a load circuit connected to the output terminal via a smoothing circuit; and a first comparator configured to monitor an output voltage generated through the smoothing circuit, and generate a pulse stopping control signal to stop the generation of the first switching pulse and the second switching pulse when the output voltage rises, and to generate the first switching pulse and the second switching pulse when the output voltage drops, wherein the switching control unit has a heavy load mode where the generation of the first switching pulse and the second switching pulse is continued according to the load of the load circuit, and a light load mode where a switching operation to generate the first switching pulse and the second switching pulse and a stopping operation to stop the generation of the first switching pulse and the second switching pulse, are repeated, and in the light load mode, the switching control unit is configured to perform the stopping operation in response to the pulse stopping control signal, and output a timing control signal to the first comparator, wherein the first comparator is further configured to change the pulse stopping control signal, in response to the timing control signal, to switch from the stopping operation to the switching operation as the load of the load circuit increases.

11. The switching regulator according to claim 10, wherein the switching control unit determines switching counts of the first switching pulse and the second switching pulse in a period of the switching operation to detect a load of the load circuit, and generates the timing control signal based on the count values.

12. The switching regulator according to claim 11, wherein an electric current value of the first comparator increases according to the timing control signal.

13. The switching regulator according to claim 11, wherein an offset value of the first comparator increases according to the timing control signal.

* * * * *

UNITED STATES PATENT AND TRADEMARK OFFICE
CERTIFICATE OF CORRECTION

PATENT NO.       : 8,878,504 B2
APPLICATION NO.  : 13/187013
DATED            : November 4, 2014
INVENTOR(S)      : Yasuhide Komiya Page 1 of 1

It is certified that error appears in the above-identified patent and that said Letters Patent is hereby corrected as shown below:

In the Specification:

Column 7, line 20, "CNT" should read --CTL--;

Column 7, line 23, "CNT" should read --CTL--;

Column 8, line 62, "COMP2" should read --COMP1--; and

Column 9, line 41, "CNT" should read --CTL--.

In the Claims:

Claim 8, column 13, line 58, "a first" should read --the first--;

Claim 8, column 14, line 3, "comparator further" should read --comparator is further--;

Claim 9, column 14, line 10, "comparator further" should read --comparator is further--; and Claim 9, column 14, line 11, "with a second" should read --with the second--.

Signed and Sealed this
Thirty-first Day of March, 2015

Michelle K. Lee
*Director of the United States Patent and Trademark Office*